US012415293B2

(12) United States Patent
Mitchell et al.

(10) Patent No.: US 12,415,293 B2
(45) Date of Patent: Sep. 16, 2025

(54) METHOD OF FABRICATING A REFRACTORY METAL CERAMIC MATRIX COMPOSITE

(71) Applicant: UT-Battelle, LLC, Oak Ridge, TN (US)

(72) Inventors: David Mitchell, Oak Ridge, TN (US); Trevor Aguirre, Oak Ridge, TN (US); Corson L. Cramer, Oak Ridge, TN (US); Richard A. Lowden, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 72 days.

(21) Appl. No.: 18/142,132

(22) Filed: May 2, 2023

(65) Prior Publication Data

US 2024/0149490 A1    May 9, 2024

Related U.S. Application Data

(60) Provisional application No. 63/338,482, filed on May 5, 2022.

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *B33Y 70/10* (2020.01);
(Continued)

(58) Field of Classification Search
CPC .............. C04B 41/457; C04B 41/4529; C04B 41/45–528
See application file for complete search history.

(56) References Cited

U.S. PATENT DOCUMENTS

| | | | |
|---|---|---|---|
| 4,338,368 A * | 7/1982 | Lovelace | C04B 41/009 428/218 |
| 5,141,775 A * | 8/1992 | Patrigeon | C04B 35/62873 156/289 |

(Continued)

FOREIGN PATENT DOCUMENTS

CN         114192801 A    *    3/2022    .............. B22F 10/28

OTHER PUBLICATIONS

Ahlhelm, et al., "Innovative and Novel Manufacturing Methods of Ceramics and Metal-Ceramic Composites for Biomedical Applications," Journal of the European Ceramic Society 36, pp. 2883-2888 (2016).

(Continued)

*Primary Examiner* — Atul P. Khare
(74) *Attorney, Agent, or Firm* — WARNER NORCROSS + JUDD LLP

(57) ABSTRACT

A method of fabricating a refractory metal ceramic matrix interpenetrating phase harsh environment capable composite is provided. The method includes forming a reinforcing phase by additive manufacturing and introducing a matrix material to the reinforcing phase. The step of introducing the matrix material may be performed by additive manufacturing or a densification process. The reinforcing phase may be a lattice formed of metal or a ceramic, and the matrix material may be a ceramic or a metal. Alternatively, the reinforcing phase formed by additive manufacturing is a laminate layer, and the matrix material introduced to the reinforcing phase is a laminate layer deposited on the reinforcing phase by additive manufacturing in a plurality of alternating layers. A refractory metal ceramic matrix composite is also disclosed. The refractory metal ceramic matrix composite includes a lattice formed by additive manufacturing, and a matrix material deposited in the lattice.

5 Claims, 9 Drawing Sheets

(51) Int. Cl.
  *B33Y 70/10* (2020.01)
  *C04B 35/56* (2006.01)
  *C04B 35/565* (2006.01)
  *C04B 41/00* (2006.01)
  *C04B 41/45* (2006.01)
  *C04B 35/00* (2006.01)

(52) U.S. Cl.
  CPC ........ *C04B 35/5607* (2013.01); *C04B 35/565* (2013.01); *C04B 41/0072* (2013.01); *C04B 41/4529* (2013.01); *C04B 41/457* (2013.01); *C04B 2235/3826* (2013.01); *C04B 2235/6026* (2013.01); *C04B 2235/614* (2013.01); *C04B 2235/616* (2013.01)

(56) References Cited

U.S. PATENT DOCUMENTS

| | | | | |
|---|---|---|---|---|
| 5,738,908 | A * | 4/1998 | Rey | C04B 35/80 427/249.2 |
| 5,933,701 | A * | 8/1999 | Stucker | B23H 1/06 419/36 |
| 6,228,437 | B1 * | 5/2001 | Schmidt | C04B 41/81 427/247 |
| 9,399,086 | B2 * | 7/2016 | Melkent | C04B 38/0051 |
| 9,943,981 | B2 * | 4/2018 | Günther | B28B 11/048 |
| 9,994,487 | B2 * | 6/2018 | Ide | C04B 41/0072 |
| 10,196,316 | B2 * | 2/2019 | Oikawa | C04B 41/63 |
| 10,302,163 | B2 * | 5/2019 | Rowe | C04B 41/52 |
| 10,399,911 | B2 * | 9/2019 | Shim | C04B 35/573 |
| 10,471,507 | B2 * | 11/2019 | Thomas | B22F 10/62 |
| 10,906,842 | B2 * | 2/2021 | Shi | C04B 35/62863 |
| 11,964,918 | B2 * | 4/2024 | Petrie | B33Y 80/00 |
| 12,024,476 | B2 * | 7/2024 | Jadidian | C04B 41/009 |
| 12,054,434 | B2 * | 8/2024 | Birol | B32B 18/00 |
| 12,077,479 | B2 * | 9/2024 | Thomas | B32B 5/022 |
| 2020/0156282 | A1 * | 5/2020 | Terrani | C04B 35/5622 |
| 2020/0189145 | A1 * | 6/2020 | Cramer | B28B 17/0063 |
| 2020/0269318 | A1 * | 8/2020 | Cramer | C22C 29/062 |
| 2020/0308062 | A1 * | 10/2020 | Klett | C04B 35/83 |
| 2020/0392049 | A1 * | 12/2020 | Razzell | C04B 41/87 |
| 2022/0055954 | A1 * | 2/2022 | Yang | C04B 35/62873 |
| 2024/0208870 | A1 * | 6/2024 | Klett | C04B 41/88 |

OTHER PUBLICATIONS

Mitchell, "Processing and Properties of a Silicon Nitride Multilayer Composite Toughened by Metallic Laminae," doctoral dissertation presented to the University of Florida, pp. 1-196 (2000).

* cited by examiner

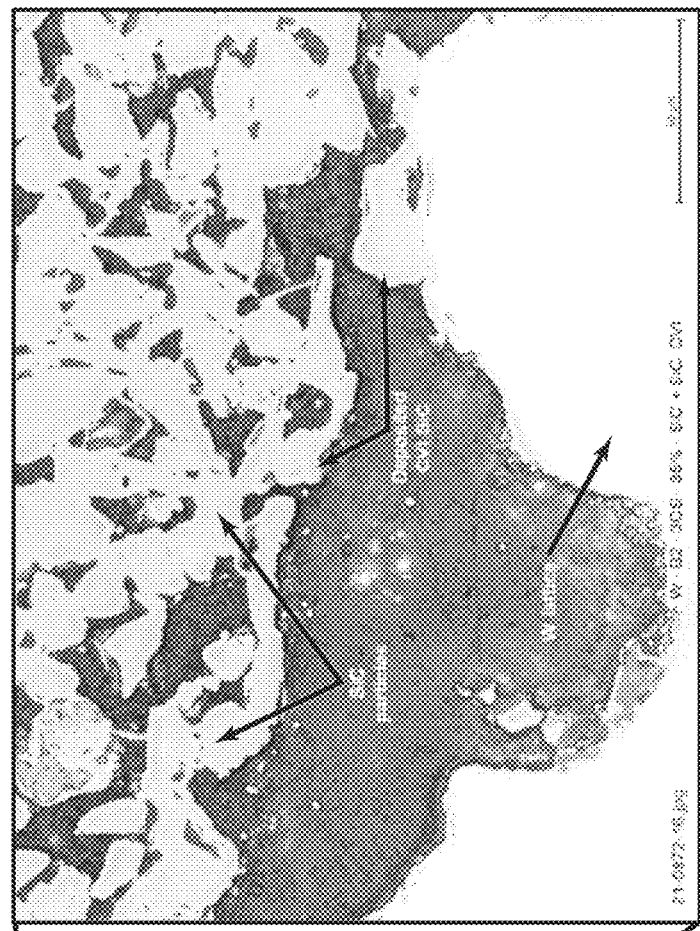
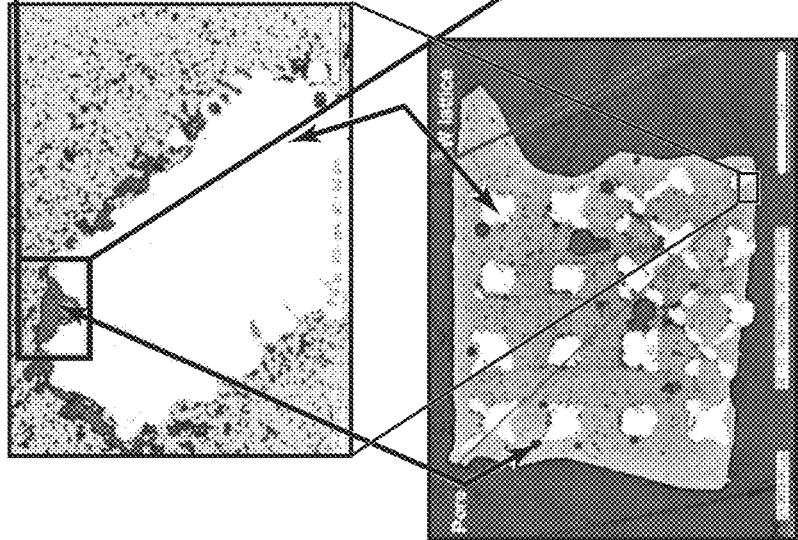
FIG. 6B
FIG. 6C
FIG. 6A

METHOD OF FABRICATING A REFRACTORY METAL CERAMIC MATRIX COMPOSITE

CROSS-REFERENCE TO RELATED APPLICATIONS

This application claims the benefit of U.S. Provisional Application No. 63/338,482, filed May 5, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a method of fabricating a refractory metal ceramic matrix composite for ultra-high temperature (harsh-environment) materials and other applications.

BACKGROUND OF THE INVENTION

Leading edges and control surfaces of high velocity vehicles (e.g., aircraft, spacecraft) experience the harshest conditions (temperatures, pressures, chemical corrosion) while also requiring precise geometry for flight control. Current state of the art carbon-carbon (C—C) composite materials are capable of withstanding the ultra-high temperatures experienced by these vehicles, but lose material via oxidation, i.e. ablation, during operation, which is undesirable for leading edges and control surfaces. Suitable material alternatives to C—C composites for use as leading edges at hypersonic velocities are refractory metals and carbide, nitride and boride ceramics. Refractory metals have high melting temperatures, but also have very high densities. Ceramics have high vaporization temperatures, high temperature oxidation resistance and relatively low densities. Both types of materials demonstrate relatively brittle failure behavior. Continuous fiber ceramic matrix composites (CMCs) have demonstrated that composite microstructures can provide a material with a brittle reinforcing phase and a brittle matrix phase that exhibits damage tolerance and graceful failure behavior. Ceramic matrix composites (CMCs) consist of a reinforcing phase, which often is formed of chopped or continuous ceramic fibers embedded in ceramic matrix. CMCs were developed to overcome the catastrophic failure mechanisms exhibited by ceramics such as silicon carbide (SiC) and silicon nitride ($Si_3N_4$), thereby providing the CMC with high strength and damage tolerance. However, current state-of-the-art ceramic composites are limited to use at temperatures of about 1250-1400° C. due to degradation of the fiber properties. Further, continuous fiber reinforced ceramic matrix composite materials are labor intensive and expensive to produce, which limits their use to a limited number of ultra-high-value applications. Automation of the fabrication process for continuous fiber ceramic matrix composite materials is also challenging, and the potential for reducing the fabrication process time is not promising if the mechanical properties of the materials are to be maintained. Therefore, a need exists for a low-cost, high-strength, temperature-resistance ceramic composite material that is more easily fabricated than conventional ceramic matrix composite materials.

SUMMARY OF THE INVENTION

An interpenetrating phase composite material of additively manufactured refractory metal lattice material infiltrated with a ceramic matrix provides such a harsh environment capable, manufacturing-friendly material. A method of fabricating such a refractory metal ceramic matrix composite is therefore provided. The method includes forming a reinforcing phase by additive manufacturing, and introducing a matrix material to the reinforcing phase.

In specific embodiments, the step of introducing the matrix material is performed by additive manufacturing.

In specific embodiments, the step of introducing the matrix material is performed by a densification process.

In particular embodiments, the densification process is one or a combination of polymer impregnation pyrolysis (PIP), reactive melt infiltration (MI), chemical vapor deposition, chemical vapor infiltration (CVI), and slurry impregnation.

In specific embodiments, the reinforcing phase is a lattice formed of a metal or a ceramic.

In particular embodiments, the metal is tungsten (W), hafnium (Hf), molybdenum (Mo), tantalum (Ta), zirconium (Zr), or combinations of these materials or their alloys.

In specific embodiments, the matrix material is a ceramic or a metal.

In particular embodiments, the ceramic is a carbide, nitride, or boride ceramic material such as silicon carbide (SiC), hafnium carbide (HfC), zirconium carbide (ZrC), tantalum carbide (TaC), titanium diboride ($TiB_2$), zirconium diboride ($ZrB_2$), silicon nitride ($Si_3N_4$), or combinations of such materials, such as $ZrB_2$—SiC.

In particular embodiments, the lattice has a solid volume percent of between 30% and 45%.

In particular embodiments, each cell of the lattice has a width in the range of 0.25 mm to 5 mm.

In specific embodiments, the reinforcing phase formed by additive manufacturing is a laminate layer, and the matrix material introduced to the reinforcing phase is a laminate layer deposited on the reinforcing phase by additive manufacturing.

In particular embodiments, the steps of forming the reinforcing phase and depositing the matrix material are repeated to form a plurality of alternating laminate layers of reinforcing phase and matrix material.

In specific embodiments, the method further includes sintering the refractory metal ceramic matrix composite obtained by introducing the matrix material to the reinforcing phase. Sintering can be used in combination with any of the other densification methods (PIP, MI, CVI, etc.).

A refractory metal ceramic matrix composite formed by the method is also provided. In some embodiments, the refractory metal ceramic matrix composite includes a lattice formed by additive manufacturing, and a matrix material deposited in the lattice.

In specific embodiments, the lattice comprises tungsten (W), hafnium (Hf), molybdenum (Mo), tantalum (Ta), zirconium (Zr), or combinations of these materials or their alloys.

In specific embodiments, the matrix material comprises a carbide, nitride, or boride ceramic material such as silicon carbide (SiC), hafnium carbide (HfC), zirconium carbide (ZrC), tantalum carbide (TaC), titanium diboride ($TiB_2$), zirconium diboride ($ZrB_2$), silicon nitride ($Si_3N_4$), or combinations of such materials, such as $ZrB_2$—SiC.

In specific embodiments, the lattice has a solid volume percent of between 30% and 45%.

In specific embodiments, the lattice comprises a plurality of cells, and each of the cells has a width in the range of 0.25 mm to 5 mm.

In specific embodiments, the lattice has an X-shaped structure, or a complex-shaped structure such as, but not limited to, a triply periodic minimal surface (TPMS) such as gyroidal, or other complex configurations.

These and other features of the invention will be more fully understood and appreciated by reference to the description of the embodiments and the drawings.

BRIEF DESCRIPTION OF THE DRAWING

FIG. 6A is a SEM micrograph of a refractory metal ceramic matrix composite formed by the method;

FIG. 6B is an enlarged view of a portion of the SEM micrograph of FIG. 6A;

FIG. 6C is an enlarged view of a portion of the SEM micrograph of FIG. 6B;

DETAILED DESCRIPTION OF THE CURRENT EMBODIMENTS

Methods of fabricating a refractory metal ceramic matrix composite and refractory metal ceramic matrix composites produced by the method are described herein. The method provides for cost-effective and non-labor-intensive fabrication of advanced heterogeneous interpenetrating phase refractory metal-ceramic composites with higher temperature capability than conventional ceramics. The disclosed heterogeneous refractory metal ceramic matrix composites may be fabricated without using chopped or continuous fiber, allowing their fabrication to be significantly easier and less expensive. The disclosed refractory metal ceramic matrix composites can be used to more quickly and much less expensively make leading edge and control surface parts for high velocity vehicles such as spacecraft, among other high and ultra-high temperature applications including industrial gas turbine energy generation parts, aero-engine parts, nuclear energy generation parts, hot gas path components, thermal protection systems, and other industrial applications.

Figure 1:
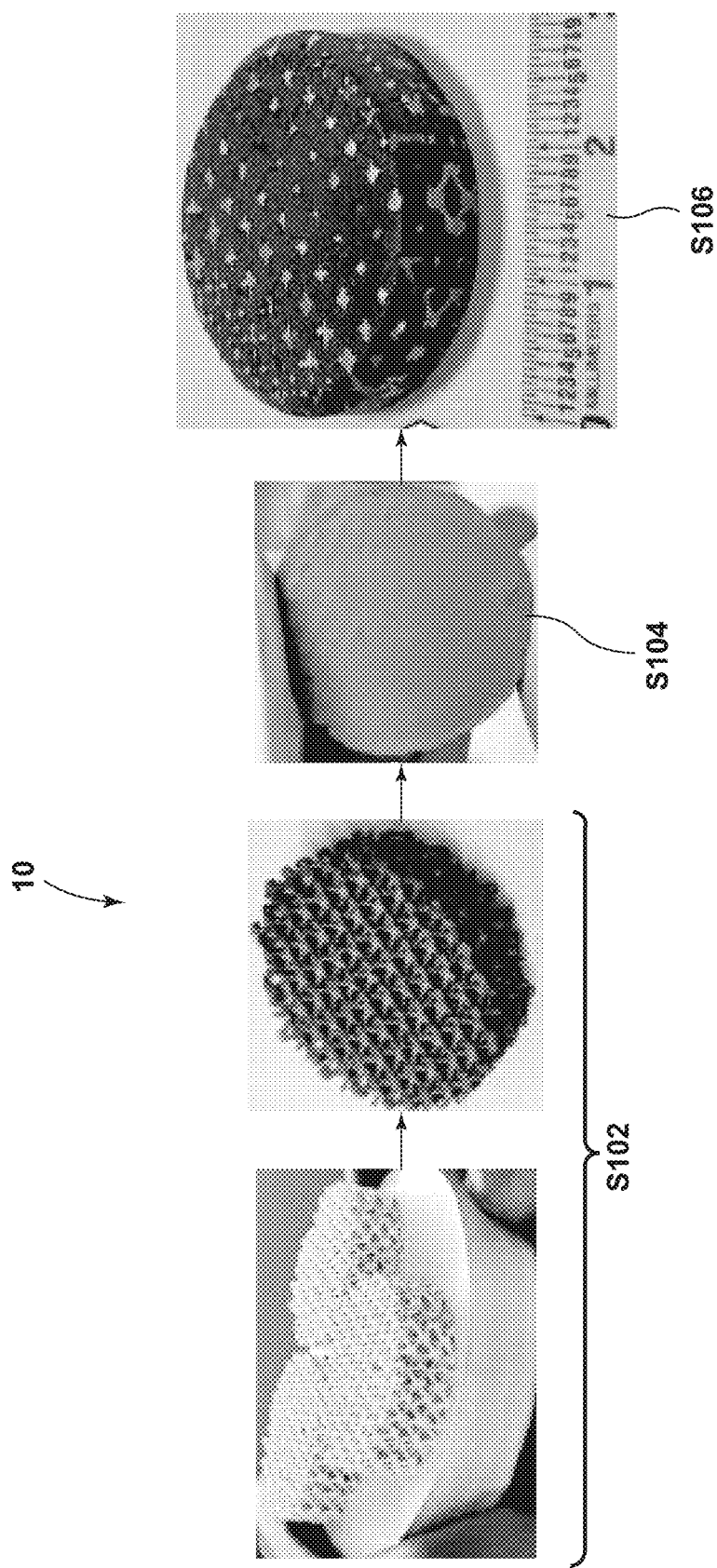
FIG. 1 is a schematic view of a method of fabricating a refractory metal ceramic matrix composite in accordance with embodiments of the disclosure.

With reference to FIG. 1, at step S102 the method 10 first includes forming a reinforcing phase by additive manufacturing. The reinforcing phase may be formed of a metal or combination of metals such as, but not limited to, a refractory metal such as tungsten (W). Other refractory metals include molybdenum (Mo), niobium (Nb), tantalum (Ta), and rhenium (Re). Alternatively, the reinforcing phase may be formed of a ceramic material such as, but not limited to, a carbide, nitride and/or boride. The additive manufacturing process used to form the reinforcing phase is not particularly limited and may be any additive manufacturing process including but not limited to electron beam melt, laser melt, laser curing, binder jet, ink jet, and direct write/extrusion processes. In some embodiments, the reinforcing phase is a simple laminate layer such as a sheet structure. In other embodiments, the reinforcing phase is a simple lattice structure or a more complex lattice/skeletal or TPMS structure as discussed in greater detail below.

Figure 2:
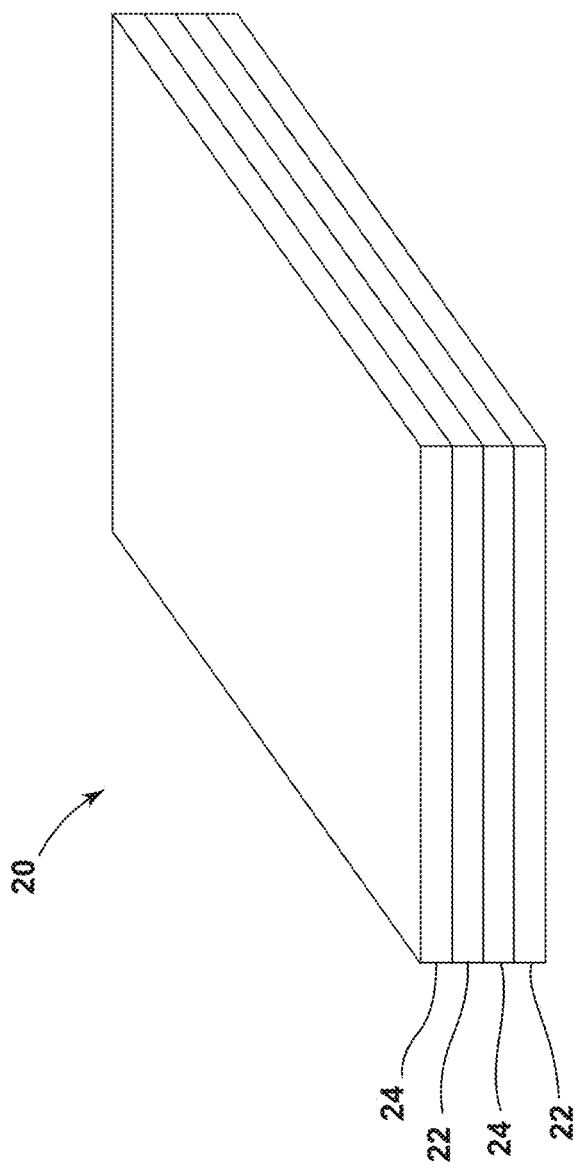
FIG. 2 is a schematic view of a refractory metal ceramic matrix composite formed by alternative embodiments of the method wherein the reinforcing phase and matrix material are formed as laminate layers

The method then includes introducing a matrix material to the reinforcing phase at step S104 to obtain the final composite product at step S106. The matrix material may be formed of a metal (e.g., refractory metal) or a ceramic material. In the case that the reinforcing phase is formed of metal, the matrix material is preferably formed of a ceramic. Likewise, in the case that the reinforcing phase is formed of a ceramic material, the matrix material is preferably formed of a metal. In some embodiments, the matrix material is a ceramic such as SiC or $ZrB_2$—SiC. The matrix material may be introduced to the reinforcing phase by infiltrating, impregnating, or depositing the matrix material into or onto the reinforcing phase. In some embodiments, the matrix material is introduced by a densification process such as but not limited to polymer impregnation pyrolysis (PIP), reactive melt infiltration (MI), chemical vapor deposition, chemical vapor infiltration (CVI), slurry impregnation, or any combination thereof. In other embodiments, the matrix material is introduced to the reinforcing phase by additive manufacturing. For example, the reinforcing phase may be a laminate layer formed by additive manufacturing, and the matrix material may also be a laminate layer that is also deposited and formed on the reinforcing phase by additive manufacturing. More particularly, in these embodiments the refractory metal ceramic matrix composite 20 may be formed by repeatedly forming alternate layers of reinforcing phase material 22 and matrix material 24 in an alternating sequential stack as shown schematically in FIG. 2. In other embodiments, the matrix material may be filled into a lattice-type reinforcing phase by additive manufacturing. Alternatively, the matrix material may be introduced by a combination of additive manufacturing and densification.

In certain embodiments, the method further includes sintering the refractory metal ceramic matrix composite obtained by introducing the matrix material to the reinforcing phase. For example, the entire composite could be additively manufactured, and then subsequently sintered to achieve sufficient density. The high melting temperatures of refractory metals enable co-sintering with ceramics, if this step is necessary.

Figure 3A:
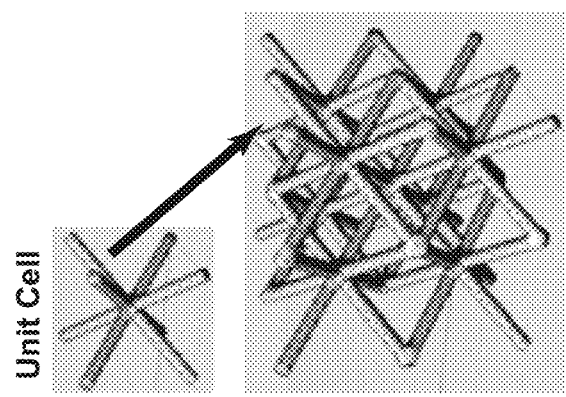
FIG. 3A is a perspective view of a unit cell and lattice structure forming a reinforcing phase in accordance with embodiments of the refractory metal ceramic matrix composite.
Figure 4B:
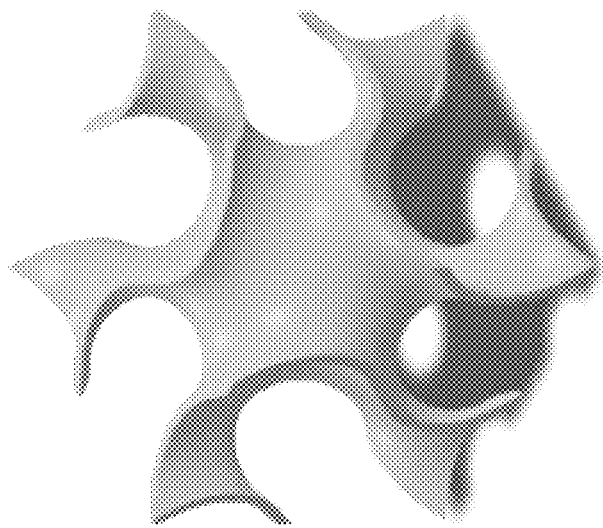
FIG. 4B is a perspective view of a unit cell of the lattice structure of FIG. 4A.
Figure 4A:
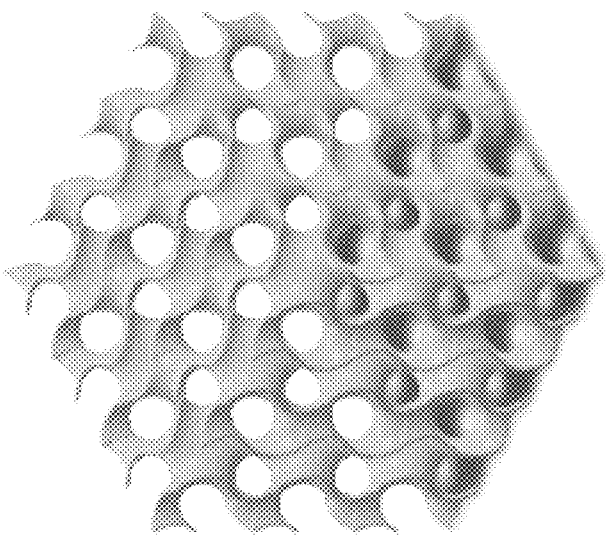
FIG. 4A is a perspective view of another lattice structure having a gyroidal TPMS structure in accordance with embodiments of the refractory metal ceramic matrix composite.

A refractory metal-ceramic matrix composite formed by the method therefore has a reinforcing phase that is formed into a lattice or laminate layer structure by additive manufacturing, and a matrix material deposited in the lattice or onto the laminate layer by additive manufacturing, a densification process, or a combination of both. In certain embodiments, the composite includes a lattice made of tungsten or molybdenum, and a SiC or $ZrB_2$—SiC ceramic matrix material deposited into the lattice. The lattice may be formed of a plurality of cells, and each of the cells may have a width in the range of 1 mm to 5 mm. For example, the lattice may have an X-shaped structure that forms each of the unit cells, such as a repeating structure of two X's that are connected at their center points and disposed perpendicular to each other FIG. 3A. The lattice may also have a solid volume percent of between 30% and 45%. Alternatively, the lattice may have a complex-shaped structure such as, but not limited to, a triply periodic minimal surface (TPMS). One example of a TPMS structure is a gyroidal structure shown in FIG. 4A and having a unit cell as shown in FIG. 4B.

Refractory metals have high melting temperatures but also very high densities. Ceramics have high sublimation temperatures, high temperature oxidation resistance, and relatively low densities. Both types of materials demonstrate relatively brittle failure behavior. The combination of refractory metal and ceramic matrix formed by a process including additive manufacturing as described above overcomes the challenge of a brittle-brittle composite to obtain a ultra-high-temperature-resistant material in an efficient, cost-effective manner. On the other hand, it is difficult to employ continuous fibers in additive manufacturing processes, and therefore it is not feasible to reduce the cost of the labor-intensive manufacturing process for producing conventional continuous fiber ceramic matrix composites by using additive manufacturing with continuous fibers.

EXAMPLES

The present method is further described in connection with the following laboratory examples, which are intended to be non-limiting.

Figure 3B:
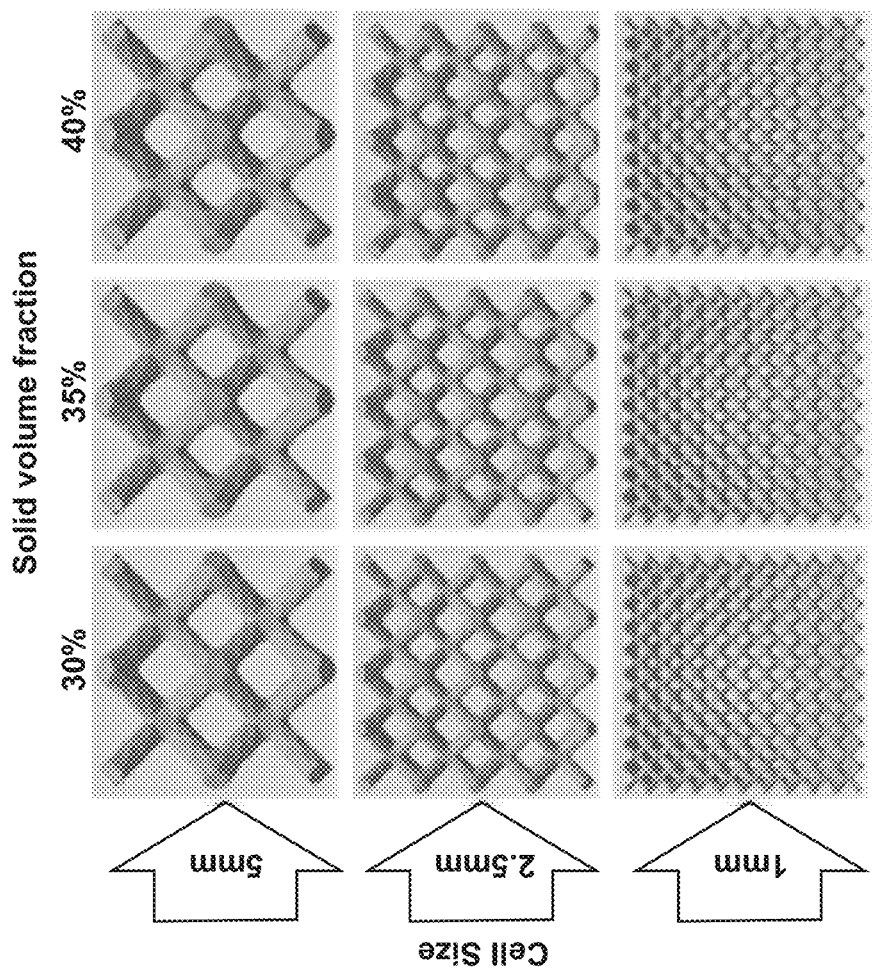
FIG. 3B is a diagram of lattice structures of the reinforcing phase of FIG. 3A having various dimensions.
Figure 5:
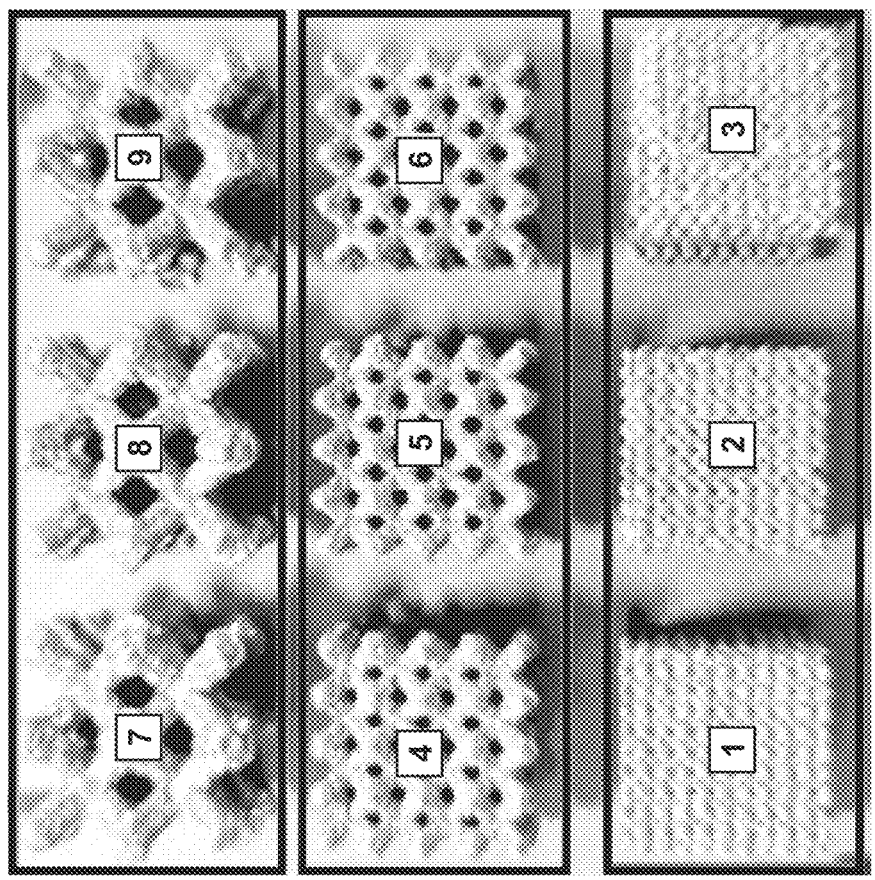
FIG. 5 is a photographical view of the various lattice structures of FIG. 3B formed by the method.
Figures 7A, 7B, 7C:
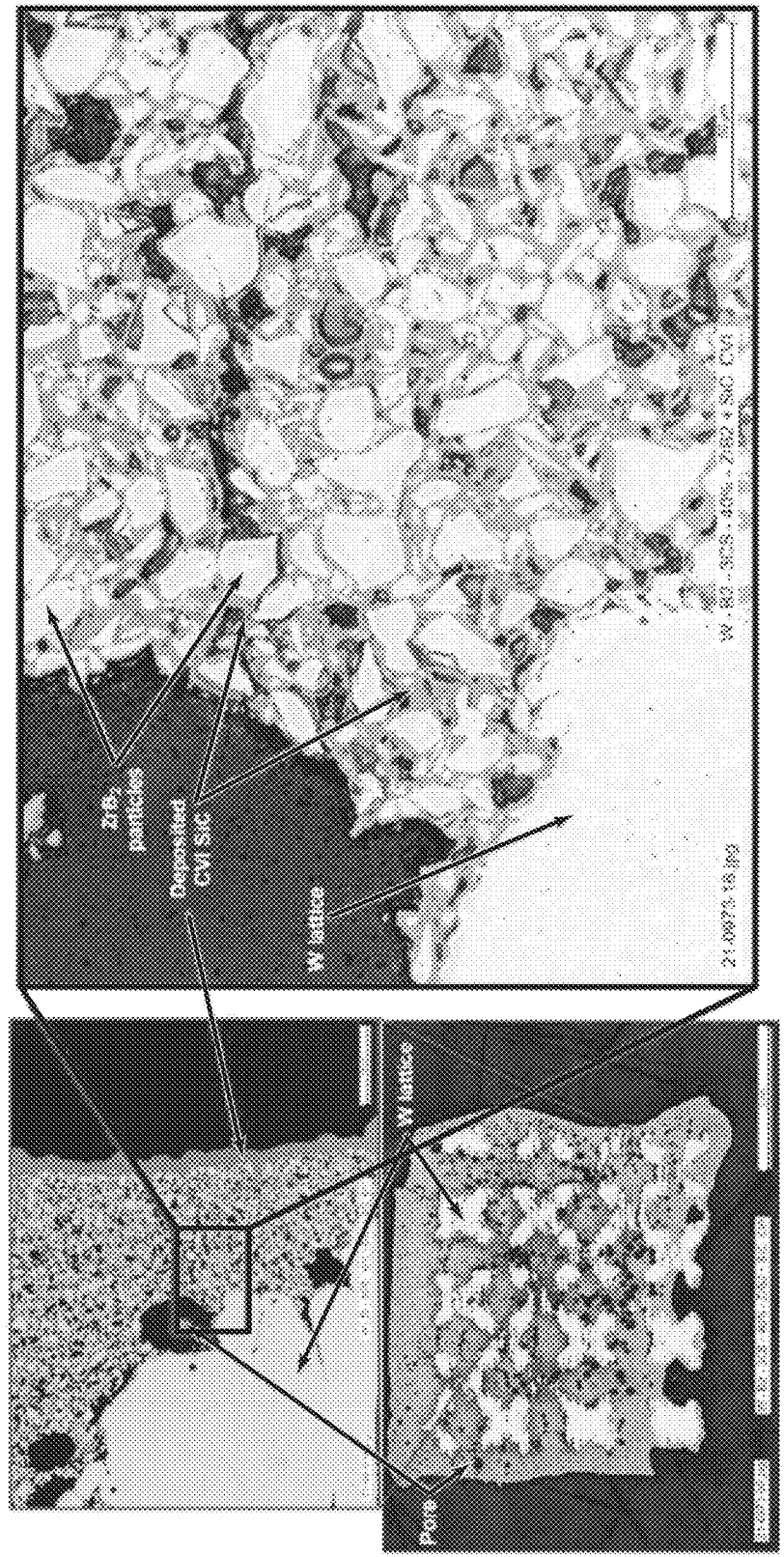
FIG. 7A is a SEM micrograph of another refractory metal ceramic matrix composite formed by the method.
FIG. 7B is an enlarged view of a portion of the SEM micrograph of FIG. 7A.
FIG. 7C is an enlarged view of a portion of the SEM micrograph of FIG. 7B.

Heterogeneous refractory metal ceramic matrix composite materials including a tungsten or molybdenum lattice and ceramic matrix were created using a combination of additive manufacturing (for the lattice reinforcing phase formed of refractory metal), combinations of ceramic particulate infiltration (for the ceramic matrix material deposited in the lattice), polymer impregnation pyrolysis and chemical vapor infiltration. With reference to FIGS. 3A and 3B, the lattice unit cell was designed using software, and then the lattice was additively manufactured of tungsten (W) using an eBeam additive manufacturing process in a vacuum as shown in FIG. 5. Nine lattices having various cell sizes (1 mm, 2.5 mm, 5 mm) and solid volume fractions (30%, 35%, 40%) were produced. Each lattice had a X-shaped unit cell, and total dimensions of 10×10×10 mm. The strut size (diameter of the rod-like members forming the X-shaped cell) was varied to obtain the three different volume fractions. With reference to FIG. 5, Samples 1, 2, and 3 were not depowdered and were solid and exhibited some delamination. Samples 4, 5, and 6 were partially depowdered and had partially sintered powder trapped inside, even after depowdering. Samples 7, 8, and 9 were (fully) depowered and had large open pore spaces (cell void spaces). Subsequently, the lattices were infiltrated with ceramic matrix material. Two different ceramic matrix materials were employed, either SiC or $ZrB_2$—SiC. Samples 1-3 were solid cubes and could not be infiltrated, samples 4-6 could be partially infiltrated, and samples 7-9 were (fully) infiltrated. More particularly, the deposition/infiltration of ceramic matrix material step was performed in two cycles. In the first particle infiltration cycle, the lattice was filled with SiC powder, a solvent binder was dripped into the lattice, the binder was cured for handling strength, and then the binder was burned out of the lattice. In the second particle infiltration cycle, chemical vapor infiltration (CVI) of SiC was performed for 4 days. FIGS. 6A-C show SEM micrographs of the resulting microstructures of the obtained W—SiC heterogenous material. The same deposition/infiltration of the lattice procedure was also performed using $ZrB_2$ powder instead of SiC powder. In this case, $ZrB_2$ powder was first filled into the lattice (instead of SiC powder), solvent binder was dripped into the lattice, the binder was cured, the binder was burned out of the lattice, and then chemical vapor infiltration (CVI) of SiC was performed for 4 days. FIGS. 7A-C show the microstructures of the obtained W—$ZrB_2$—SiC heterogenous material. The CVI SiC coating is more visible in the SEM micrograph of W—$ZrB_2$—SiC in comparison to the SEM micrograph of W—SiC because the CVI SiC coating is a different material from the $ZrB_2$ particles.

Figure 8:
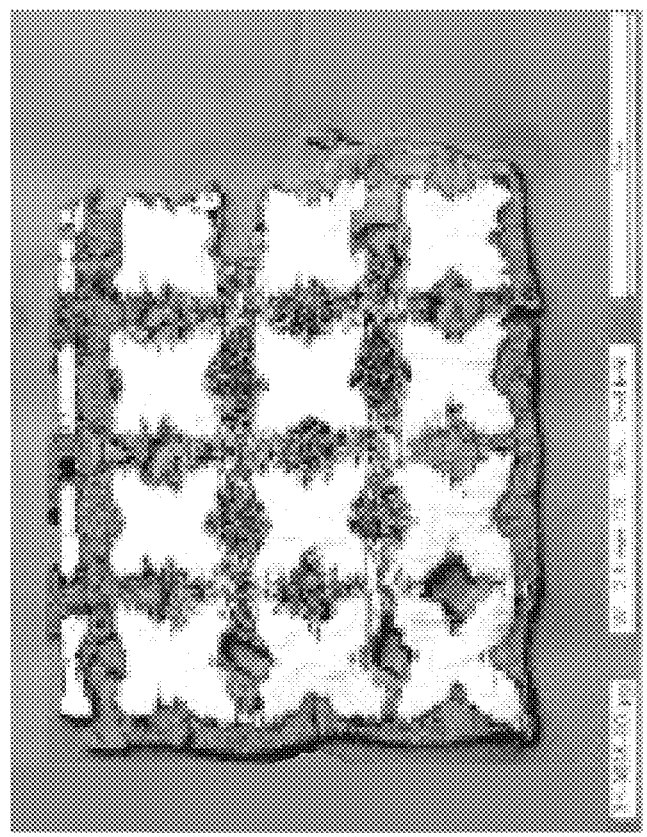
FIG. 8 is a SEM micrograph of yet another refractory metal ceramic matrix composite formed by the method.

The particle infiltration described above lead to sufficient density of ceramic matrix. As an alternative process of infiltration, polymer impregnation pyrolysis (PIP) was performed by filling the tungsten lattices with a slurry of SiC ceramic particle-loaded preceramic polymer resin by dripping the slurry into the lattice. An SEM micrograph of the resulting structure is shown in FIG. 8. Some slurry was lost during cure due to low viscosity, but this infiltration/deposition procedure led to acceptable results.

Figure 9:
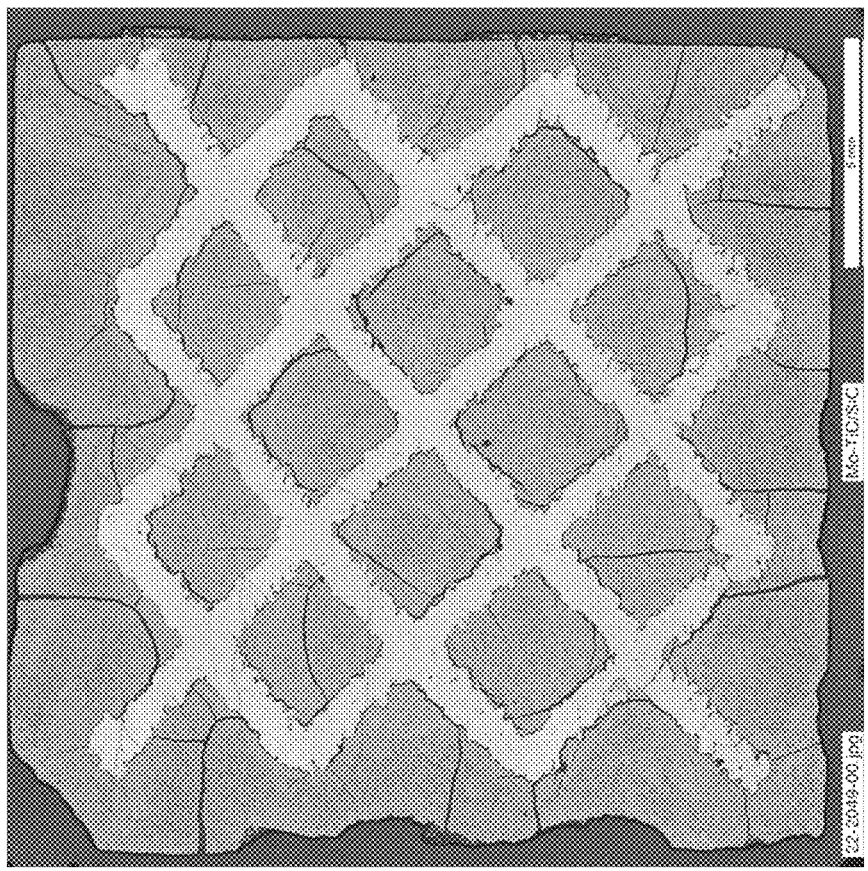
FIG. 9 an optical micrograph (not SEM) of yet another refractory metal ceramic matrix composite (a molybdenum-SiC composite) formed by the method.

Another embodiment was created by fabricating a molybdenum lattice via laser powder bed fusion additive manufacturing, then infiltrating the lattice with SiC via polymer impregnation pyrolysis (PIP) using a preceramic polymer loaded with greater than 30 volume percent SiC powder. The increased powder volume resulted in a higher viscosity slurry and improved SiC microstructure following PIP relative to the tungsten composite shown in FIG. 8. An optical micrograph of the resulting molybdenum-SiC composite structure is shown in FIG. 9.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of fabricating a refractory-metal, ceramic-matrix composite, the method comprising:
    forming a reinforcing phase by additive manufacturing, wherein the reinforcing phase is a lattice formed of a refractory metal that is one of tungsten (W) or molybdenum (Mo); and
    introducing matrix material to the reinforcing phase in a two-cycle infiltration process including a first cycle and a second cycle, wherein in the first cycle the lattice is filled with a first matrix material in powder form, solvent binder is dripped into the lattice, the binder is cured, and the binder is burned out of the lattice, and in the second cycle a second matrix material is added to the lattice by chemical vapor infiltration;
    wherein each of the first matrix material and the second matrix material is a ceramic, and either: i) the first matrix material and the second matrix material are both silicon carbide (SiC), or ii) the first matrix material is zirconium diboride ($ZrB_2$) and the second matrix material is SiC.

2. The method of claim 1, wherein the lattice has a solid volume percent of between 30% and 45%.

3. The method of claim 1, wherein the lattice includes a plurality of cells, and each of the plurality of cells of the lattice has a width in the range of 0.25 mm to 5 mm.

4. The method of claim 1, wherein subsequent to the step of introducing the matrix material to the reinforcing phase, the method further includes sintering a product obtained by introducing the matrix material to the reinforcing phase.

5. The method of claim 1, wherein the lattice has an X-shaped structure or a triply periodic minimal surface (TPMS) structure.

* * * * *